(12) United States Patent
Knox

(10) Patent No.: US 8,539,574 B2
(45) Date of Patent: Sep. 17, 2013

(54) USER AUTHENTICATION AND ACCESS CONTROL SYSTEM AND METHOD

(76) Inventor: Christopher Michael Knox, San Marcos, CA (US)

( * ) Notice: Subject to any disclaimer, the term of this patent is extended or adjusted under 35 U.S.C. 154(b) by 176 days.

(21) Appl. No.: 12/878,205

(22) Filed: Sep. 9, 2010

(65) Prior Publication Data

US 2012/0066744 A1    Mar. 15, 2012

(51) Int. Cl.
*H04L 29/06* (2006.01)
*G06F 21/00* (2013.01)

(52) U.S. Cl.
USPC .............. 726/17; 726/1; 726/2; 726/3; 726/4; 726/5; 726/7; 726/16; 726/19; 726/21; 726/26; 726/27; 726/30; 713/168; 713/182; 713/183; 713/184; 709/217; 709/219; 709/225; 709/226; 709/229

(58) Field of Classification Search
USPC ............... 726/1–21, 26–30; 713/182–186, 713/168–170; 709/217–229
See application file for complete search history.

(56) References Cited

U.S. PATENT DOCUMENTS

| | | | | |
|---|---|---|---|---|
| 6,718,471 | B1 * | 4/2004 | Kashima | 726/9 |
| 2002/0083347 | A1 * | 6/2002 | Taguchi | 713/202 |
| 2004/0030934 | A1 * | 2/2004 | Mizoguchi et al. | 713/202 |
| 2004/0093527 | A1 * | 5/2004 | Pering et al. | 713/202 |
| 2007/0094717 | A1 * | 4/2007 | Srinivasan et al. | 726/5 |
| 2007/0277235 | A1 * | 11/2007 | Barrett et al. | 726/12 |
| 2008/0168546 | A1 * | 7/2008 | Almeida | 726/6 |
| 2010/0083353 | A1 * | 4/2010 | Wang | 726/5 |

OTHER PUBLICATIONS

Graphical Password Authentication Using Cued Click Points by Chiasson et al; Publisher: Springer-Verlag Heidelberg; Year: 2007.*
Authenticating Mobile Device Users Through Image Selection by Wayne Jansen; Publisher: NIST; Year: 2004.*
Doodling Our Way to Better Authentication by Goldberg et al; Publisher: CHI; Year: 2002.*

* cited by examiner

*Primary Examiner* — Madhuri Herzog
(74) *Attorney, Agent, or Firm* — John R. Ross; John R. Ross, III

(57) ABSTRACT

A system and method for permitting user access to a computer controlled device. A display device displays a group of items to the user. Some of the items are known to the user and some are unknown to the user. An input device receives user input from the user. The user input indicates the presence or absence of the known items within the group of items without specifically identifying which items are known and which items are unknown. A computer is programmed to automatically compare the user input to a predetermined answer. If the user input is correct an access device allows access. In one preferred embodiment the user input includes a count of the number of known items within the group of items. In another preferred embodiment the group of items includes subgroups. The user input includes an identification of which subgroup has the largest number of known items. In another preferred embodiment the group of items is displayed in a grid. The known items are displayed in a pattern within the grid. Multiple comparison patterns are displayed along with the grid. The user input includes an identification of which comparison pattern matches the pattern of the known items within the grid.

18 Claims, 15 Drawing Sheets

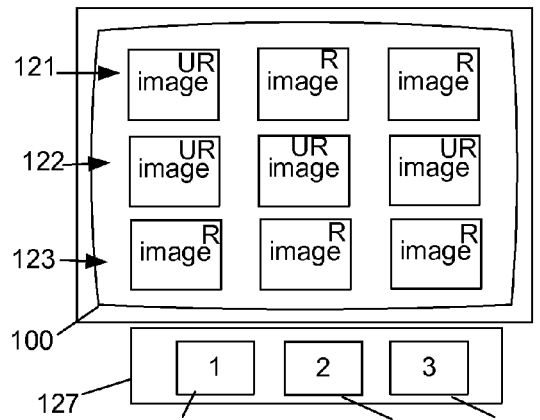
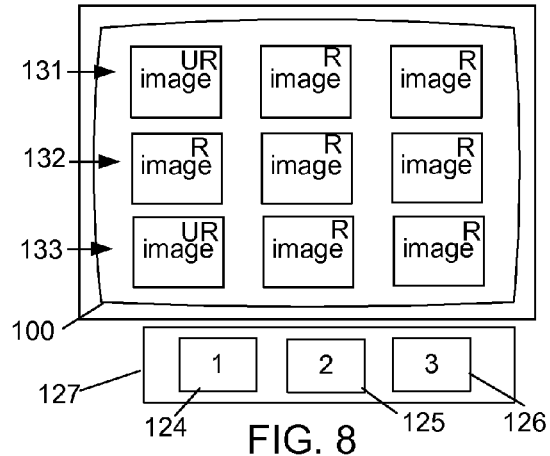
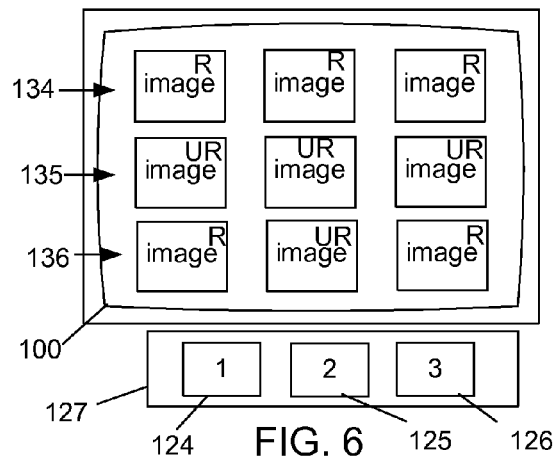
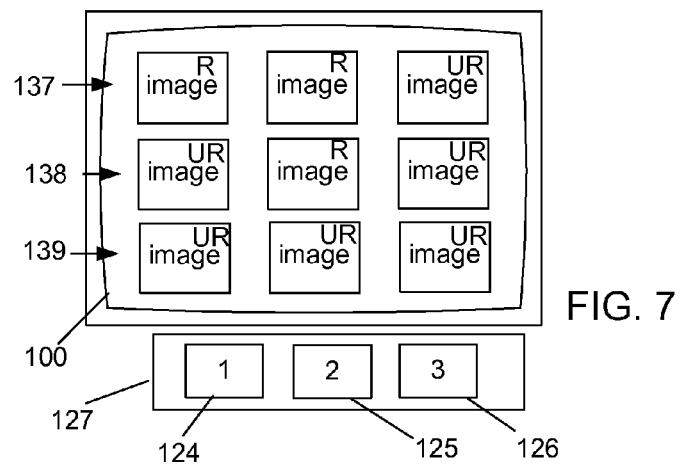

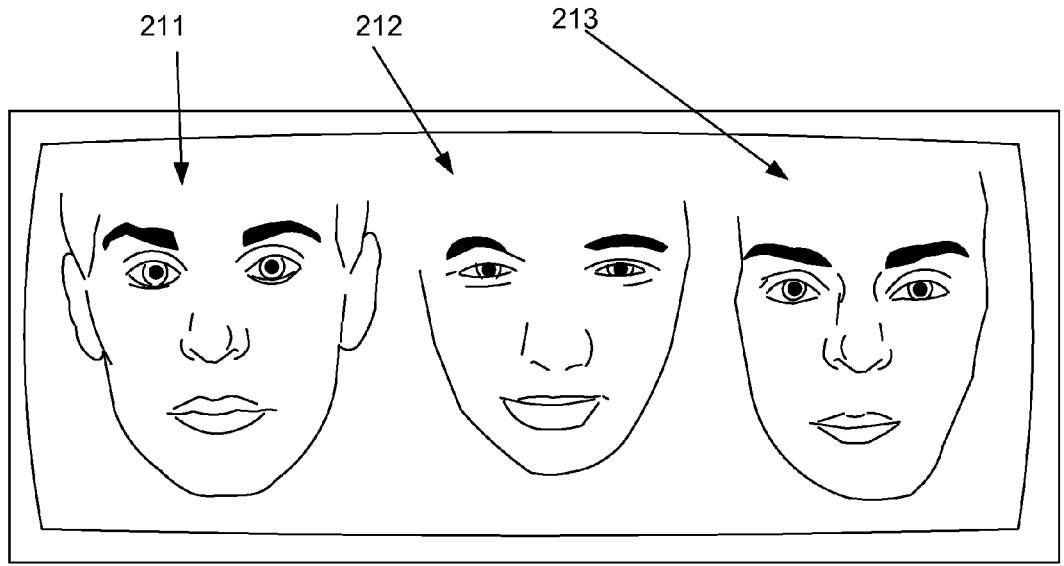
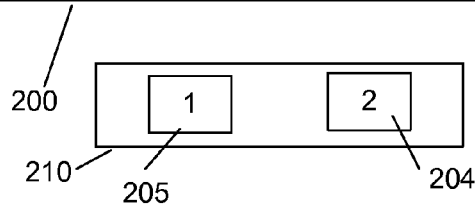
FIG. 16
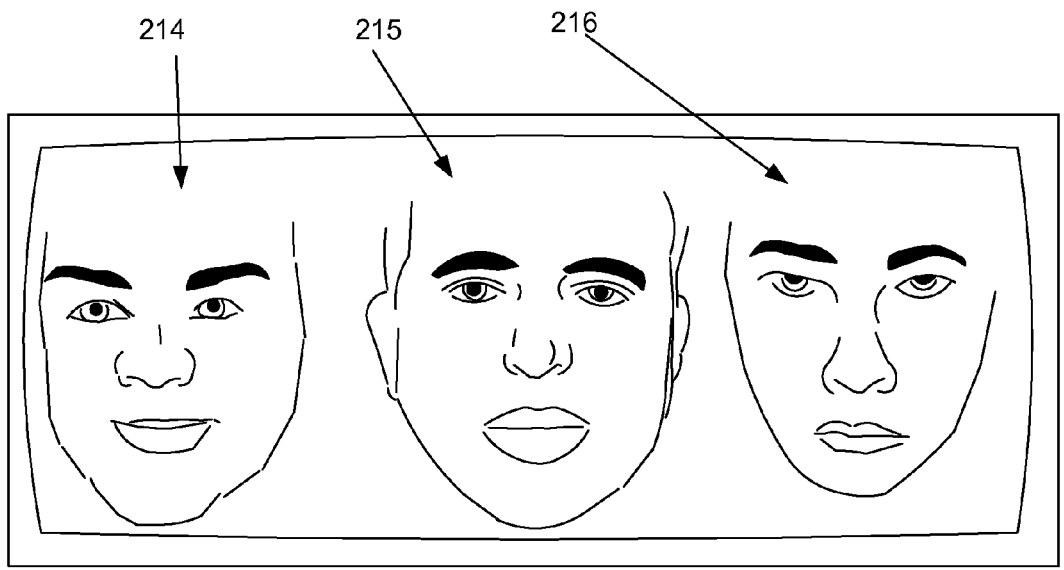
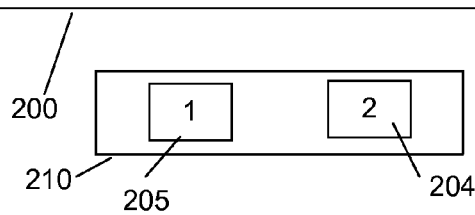
FIG. 17

USER AUTHENTICATION AND ACCESS CONTROL SYSTEM AND METHOD

The present invention relates to user authentication systems, and in particular, to user authentication systems controlled by computers.

BACKGROUND OF THE INVENTION

Ever since humanity assigned value to resources such as property and information, there has been a need for access control methods, that is, methods to keep unauthorized entities from gaining access to the resources. This started with simply hiding the resources and then proceeded to the locking away of resources. As information became more and more valuable, encryption was added to the arsenal—a resource may be accessible but rendered useless to anyone but authorized entities. In the electronic age computers are used to control access. A terminal (such as a display with a keypad or keyboard) is presented to a user who wishes to gain access and an access procedure is required to be performed successfully.

Computer security is a major concern in modern society. Personal, confidential and classified information is stored on computers. For example, banking is conducted via the Internet, personal secure data is stored on computer systems, and documents detailing classified information are also stored on computers. Unfortunately, computers and computer networks are very susceptible to unauthorized access (hacking or attack.)

A common prior art method of controlling access to a computer system is to require the user to enter a username and then a password. For example, FIG. 29 shows a prior art entry screen. The user has entered his username and then his password. To gain entry the user clicks on the Enter button as shown. If the correct username and password are entered, the user is allowed access to the system. The entity determining whether to allow access can be called a verifier (since it needs to verify the provided access information.) The user requesting access needs to have previously established an account with the verifier through an enrollment process. The account can be considered the information that is used to allow access—in the present case the username and password. This information is a shared secret; both the user and the verifier must have it in their possession for an access procedure to succeed. A shared secret is really an oxymoron; the ideal secret is one that is not shared. The fact that both user and verifier store this secret considerably increases the chance that an unauthorized entity can get hold of it—it increases the vulnerability or weakness of the protection. Other weaknesses are inherent in the specific access control method and also in the user of the method.

To have maximum effectiveness as a security measure, a password must be hard to guess. If the user has a simple password to remember, it is more likely that an attacker will be able to quickly guess his password. Therefore, a user is advised to pick a password that is hard to guess and is comprised of random letters and numbers (similar to the password shown in FIG. 29). The problem, however, with a password of random numbers and letters is that the password is difficult for the user to remember. This is especially true if the user has multiple accounts requiring multiple passwords. If the user does have multiple accounts, he will typically do one or more of the following: 1) the user may just use the same password for each account, or 2) he may have multiple random passwords, but just write them all down so that he does not have to remember them, or 3) he may not change his password as frequently as he should.

These user behaviors significantly increase the vulnerability of this prior art method. For example, if the user repeatedly uses the same password, an attacker will only need to figure out the password once and will then know how to access all of the user's files. Likewise, if the user chooses many passwords and writes them down, an attacker will only need to find the document that lists the passwords and then he can gain easy access to the user's systems.

Additional weaknesses are: the access procedure has to be hidden—an attacker could simply observe (possibly from a distance) the person entering their password or—more worryingly—use key-logging software to record the user's entry for later retrieval. A user may also be tricked into revealing his password (social engineering, phishing,) or simply tell a colleague or acquaintance.

Of great concern are also the increasingly sophisticated and automated attacks on computer systems and the compromising of verifier systems with often millions of records of user account information stolen.

Other prior art access control methods include challenge-response security questions, biometric identification (iris scans, fingerprint scans,) and hardware tokens. All address some of the mentioned vulnerabilities but introduce others or add inconvenient or expensive requirements (extra hardware, for example.)

What is needed is a better system for user authentication for allowing secure access to a computer controlled device.

SUMMARY OF THE INVENTION

The present invention provides a system and method for permitting secure user access to a computer controlled device. A display device displays a group of items to the user. Some of the items are known to the user and some are unknown to the user. An input device receives user input. The user input indicates the presence or absence of the known items within the group of items without specifically identifying which items are known and which items are unknown. A computer is programmed to automatically compare the user input to a predetermined answer. If the user input is correct an access device allows access. In one preferred embodiment the user input is a count of the number of known items within the group of items. In another preferred embodiment the user compares subgroups of items on the entry screen. The most familiar subgroup, that is, the subgroup with the most known items is the user's input. In another preferred embodiment the group of items is displayed in a grid. The known items are displayed in a pattern within the grid. Multiple comparison patterns are displayed along with the grid. The user input is an identification of which comparison pattern matches the pattern of the known items within the grid.

BRIEF DESCRIPTION OF THE DRAWINGS

FIGS. 5-8 show a second preferred embodiment of the present invention.

FIGS. 14-17 show a fourth preferred embodiment of the present invention.

DETAILED DESCRIPTION OF THE PREFERRED EMBODIMENTS

Figure 1:
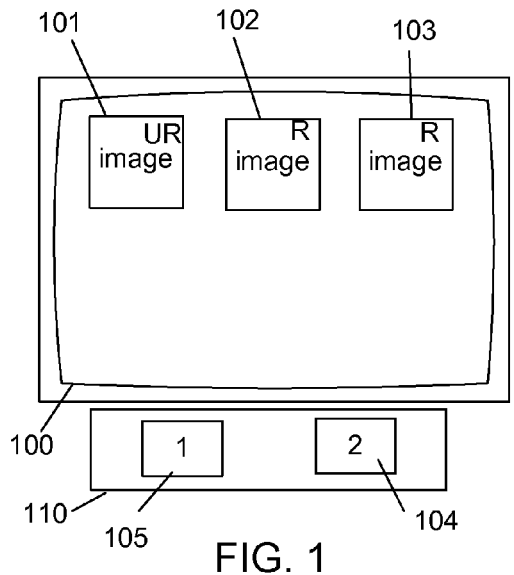
FIGS. 1-4 show a first preferred embodiment of the present invention.

The method employs a large pool of numeric passcodes. For each access procedure a small, random subset of this pool is displayed in a graphical manner as a sequence of entry screens. For example, FIGS. 1-4 show 4 different entry screens. Each entry screen is a digit in the passcode. The passcodes can be of arbitrary length. An entry screen is presented to the user by a terminal (monitor screen 100) as a single image made of items of a similar kind. Item kinds include any sort of item—images, words or phrases or audio clips.

Items within each kind furthermore fall into one of two categories:
1) items which are strongly recognizable by (or 'known' to) the user—for example, faces of relatives or friends or pets.
2) items which are weakly recognizable by (or 'unknown' to) the user—for example, faces of arbitrary strangers or pets.

Some of the features of the present invention include:
1) when presented with a mix of items of a given kind, a user can quickly and easily decide the category of each item: known or unknown. An access procedure consists of a sequence of such decisions, and access is granted only when the correct decisions have been made.
2) the user does not indicate the item categories during the access procedure—rather, he uses one of three variants of the method to give his input in an indirect manner. This means that the input can be observed or intercepted during transmission with no ill effect.
3) not even a verifier needs to know which items fall into which category—it is a secret that is only kept inside the user's brain. This means that a verifier's store of account information is of very limited use to an attacker.
4) each access procedure uses a random passcode from a large pool and is for all intents and purposes unique (and therefore useless to an observer/attacker.)
5) the security/convenience trade-off of the access procedure can be flexibly chosen by increasing or decreasing the number of entry screens, and/or changing the item kind or variant.
6) each access procedure, no matter the variant or item kind, follows the same principle and draws on the already-established memory of a user. A user does not need any training.
7) entry screens are represented by single images—the constituent items are part of that image and are not individually transmitted or directly accessible. This makes automated attacks much harder, since the items of interest are not easily extractable. It also makes spoofing or phishing (substituting fake items) much more difficult if not impossible.

The present invention is simple to use, simple to implement, applicable to a wide range of uses and have no special requirements for hardware or user training. The present invention removes some or all of the vulnerabilities of prior art methods. There is no shared secret between the user and the verifier, observation of access procedures is useless and automated attacks are virtually impossible.

In the present invention a user is granted access to a computer controlled device after being properly authenticated. The user first must identify himself to the computer controlled device. For example, if the user is trying to access a website or a computer program, he will enter a username. Likewise, if the user is attempting to access a bank ATM machine, the user will insert his ATM ID card into the machine.

Then, to achieve proper authentication the user looks at multiple items on a sequence of entry screens. Some of the items are known to the user and recognized by the user. Some of the items are unknown to the user and are unrecognized by the user. To gain access the user looks for known items that he recognizes. He then makes an indication through the terminal that reflects the recognized items. Since only the user knows what items he recognizes, the computer is less susceptible to hacking and unauthorized access.

When a user observes the group of items, he does not click on or select specific items. Rather, he makes a mental note of the presence of known items or the lack of known items and enters this information indirectly. The user's input does not indicate which items are known or unknown. Therefore, attackers or unauthorized individuals cannot learn what items are known and unknown even if they observe clearly and directly the user's inputs and the entry screens. Hence, the level of security is very high.

First Preferred Embodiment ("Count" Variant)

A first preferred embodiment of the present invention is shown in FIGS. 1-4. As shown, a user is trying to gain access to a computer system. The user has properly identified himself to the verifier by entering his username.

FIG. 1 shows monitor screen 100 and keypad 110. After the entry of his username, monitor screen 100 displays unique items 101-103 to the user. Item 101 is unrecognized by the user (indicated by "UR"). Items 102 and 103 are both recognized by the user (indicated by "R"). Because the user recognizes two of the three items he presses button 104 on keypad 110 to indicate "2".

Figure 2:
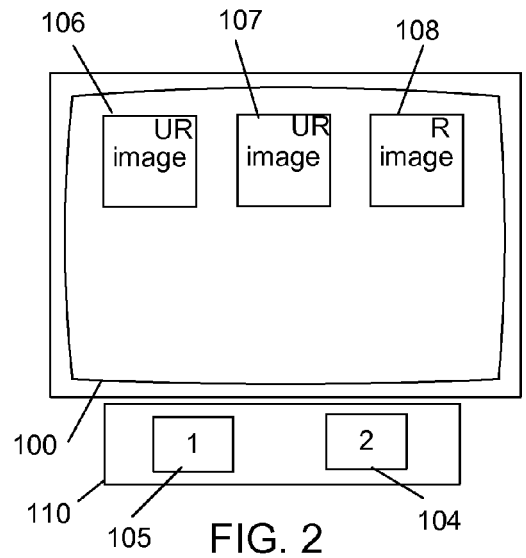

In FIG. 2 monitor screen 100 displays unique items 106-108. Items 106 and 107 are unrecognized by the user. Item 108 is recognized by the user. Because the user only recognizes one of the three items he presses button 105 on keypad 110 to indicate "1".

Figure 3:
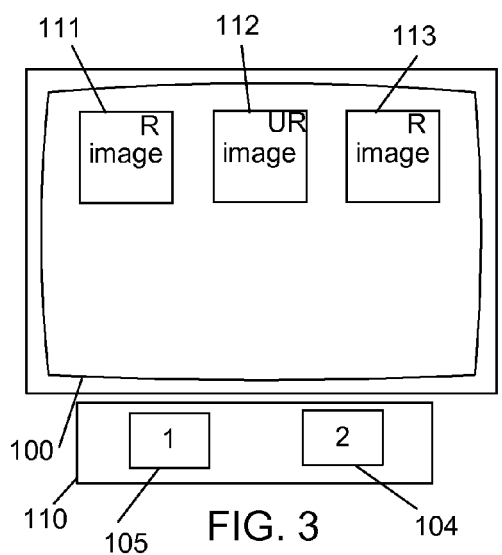

In FIG. 3 monitor screen 100 displays unique items 111-113. Item 112 is unrecognized by the user. Items 111 and 113 are both recognized by the user. Because the user recognizes two of the three items he presses button 104 on keypad 110 to indicate "2".

Figure 4:
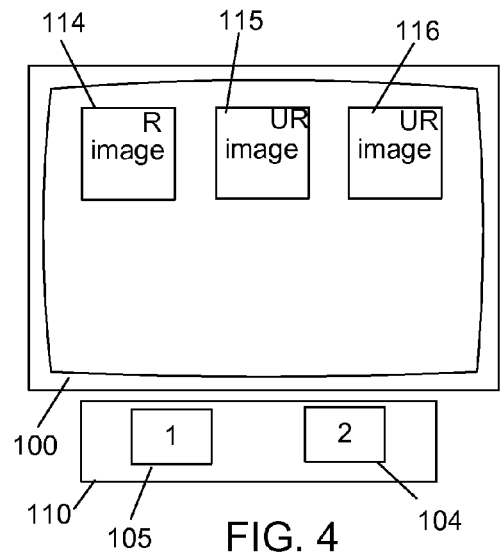

In FIG. 4 monitor screen 100 displays unique items 114-116. Items 106 and 107 are unrecognized by the user. Item 108 is recognized by the user. Because the user only recognizes one of the three items he presses button 105 on keypad 110 to indicate "1".

Hence, as described above, the solution for allowing access to the computer system is 2-1-2-1.

Second Preferred Embodiment ("Compare" Variant)

FIG. 5 shows monitor screen 100 and keypad 127. Monitor screen 100 displays 9 unique items in three rows 121-123. The items recognizable by the user are indicated by an "R". The items unrecognized by the user are indicated by "UR". The third row (row 123) is the row with the most recognizable items. Three of the items are recognizable. Because row 123 has the most recognizable items, the user presses button 126 on keypad 127 to indicate "3".

In FIG. 6 the first row (row 134) is the row with the most recognizable items. Three of the items are recognizable. Because row 134 has the most recognizable items, the user presses button 124 on keypad 127 to indicate "1".

In FIG. 7 the first row (row 137) is the row with the most recognizable items. Two of the items are recognizable. Because row 137 has the most recognizable items, the user presses button 124 on keypad 127 to indicate "1".

In FIG. 8 the second row (row 132) is the row with the most recognizable items. Three of the items are recognizable. Because row 132 has the most recognizable items, the user presses button 125 on keypad 127 to indicate "2".

Hence, as described above, the solution for allowing access to the computer system is 3-1-1-2.

Third Preferred Embodiment ("Match" Variant)

Figure 9:
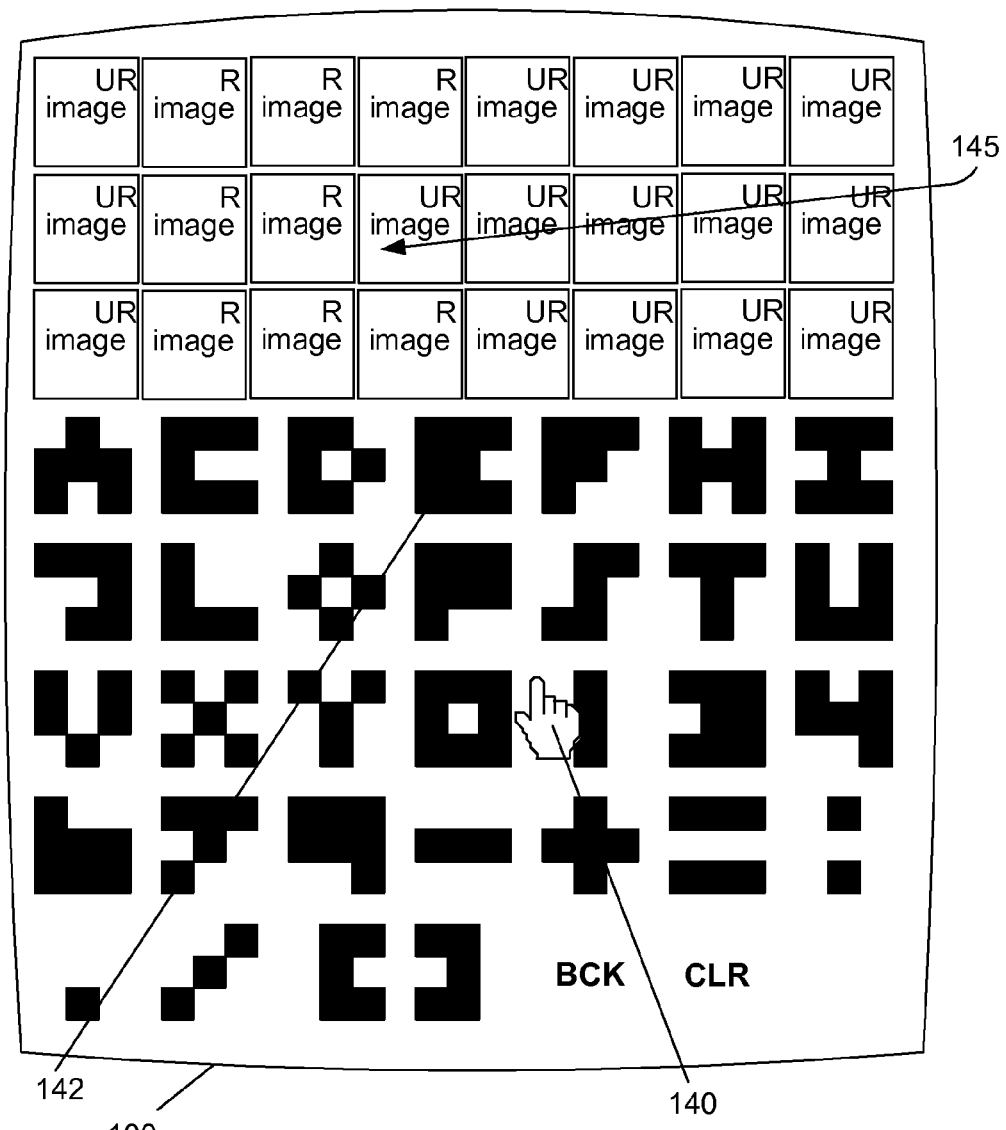
FIGS. 9-13 show a third preferred embodiment of the present invention.
Figure 10:
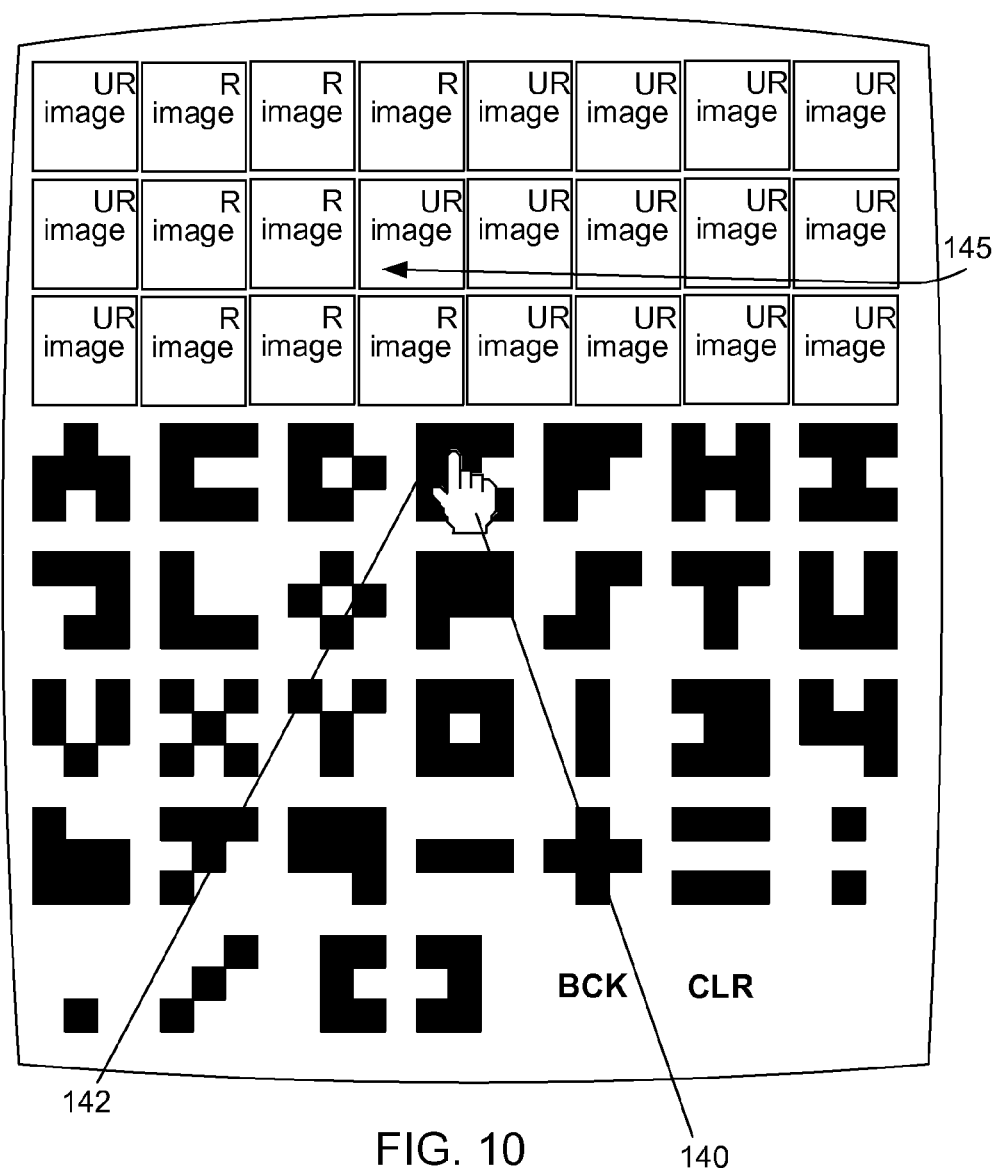

FIG. 9 shows another preferred embodiment of the present invention. In FIG. 9 a grouping of items arranged in an 8×3 grid are presented at the top of screen 100. A majority of the items are unrecognizable to the user (as indicated by "UR"). Some of the items are recognizable to the user (as indicated by "R"). As shown in FIG. 9, the recognizable items are arranged in pattern 145 that approximately is similar to the letter "E". To gain access the user manipulates pointer 140 with a computer mouse so that it is positioned over a comparison pattern that matches the pattern formed by the recognizable items. For example in FIG. 9, pattern 142 matches the pattern formed by the recognizable items. Therefore in FIG. 10 the user has moved pointer 140 so that it is positioned above pattern 142. The user then clicks on pattern 142.

Figure 11:
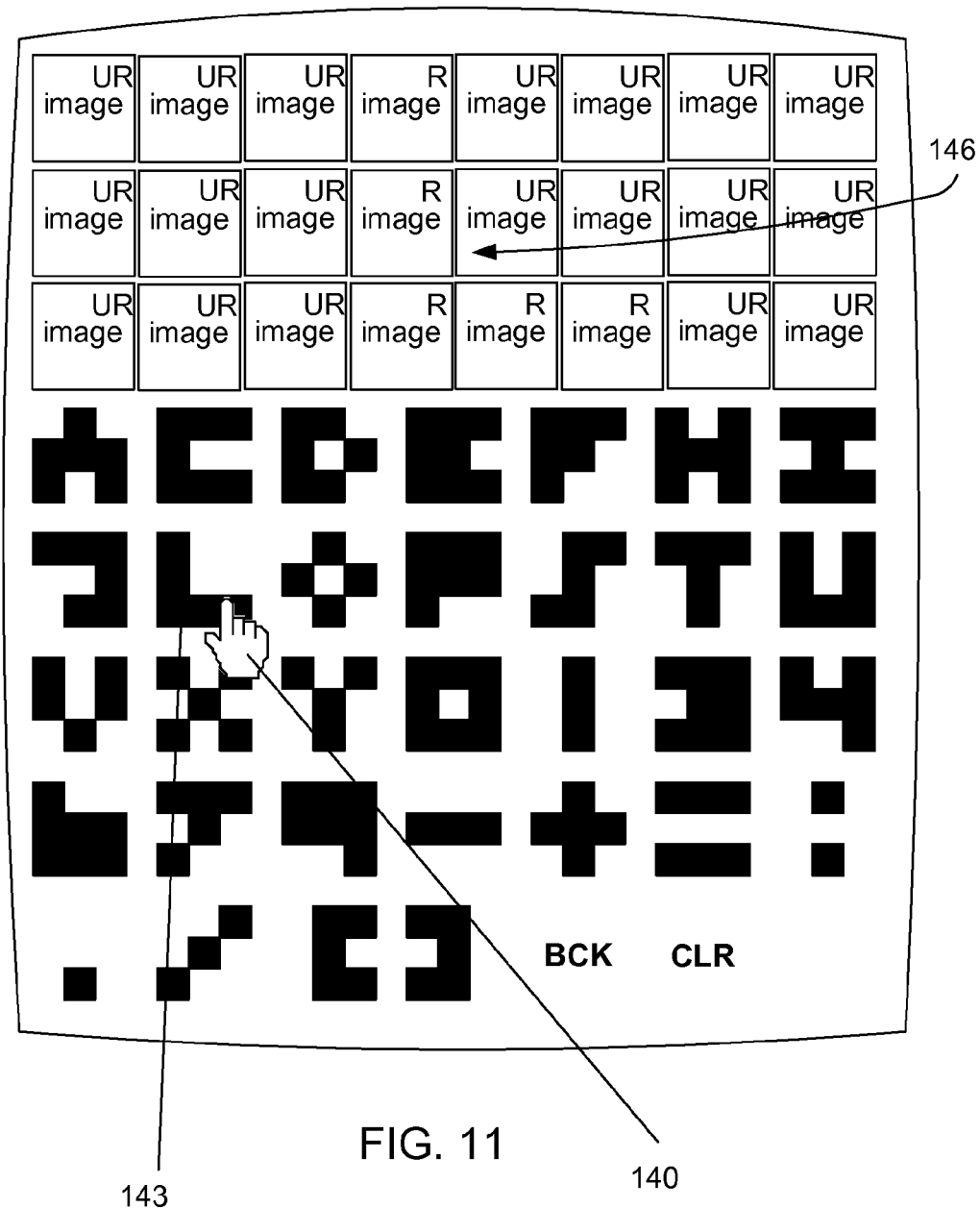

After clicking on pattern 142, screen 100 presents the screen view shown in FIG. 11. In FIG. 11, pattern 143 matches pattern 146 formed by the recognizable items. Therefore the user moves pointer 140 so that it is positioned above pattern 143. The user then clicks on pattern 143.

Figure 12:
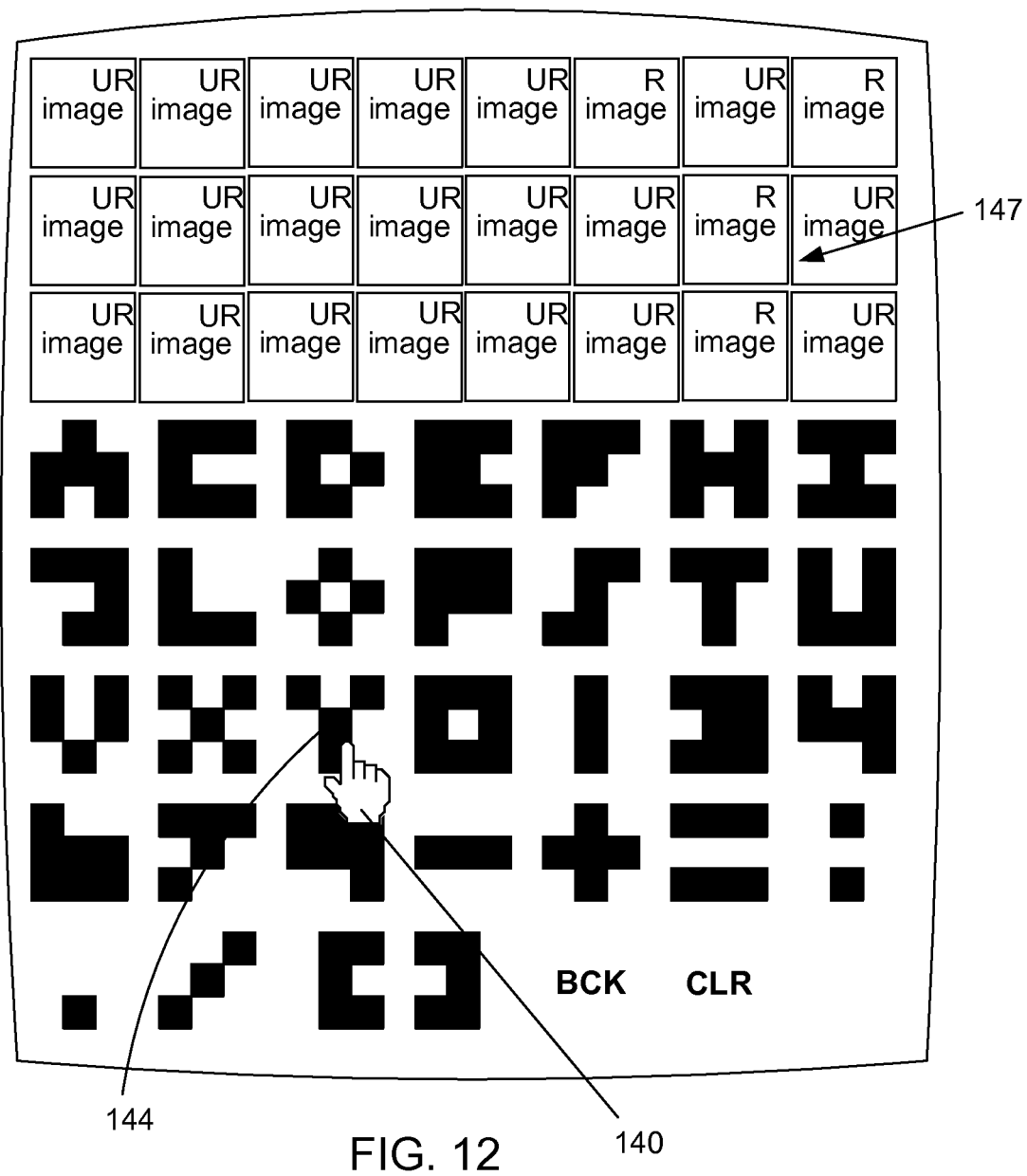

After clicking on pattern 143, screen 100 presents the screen view shown in FIG. 12. In FIG. 12, pattern 144 matches pattern 147 formed by the recognizable items. Therefore the user moves pointer 140 so that it is positioned above pattern 144. The user then clicks on pattern 144.

Figure 13:
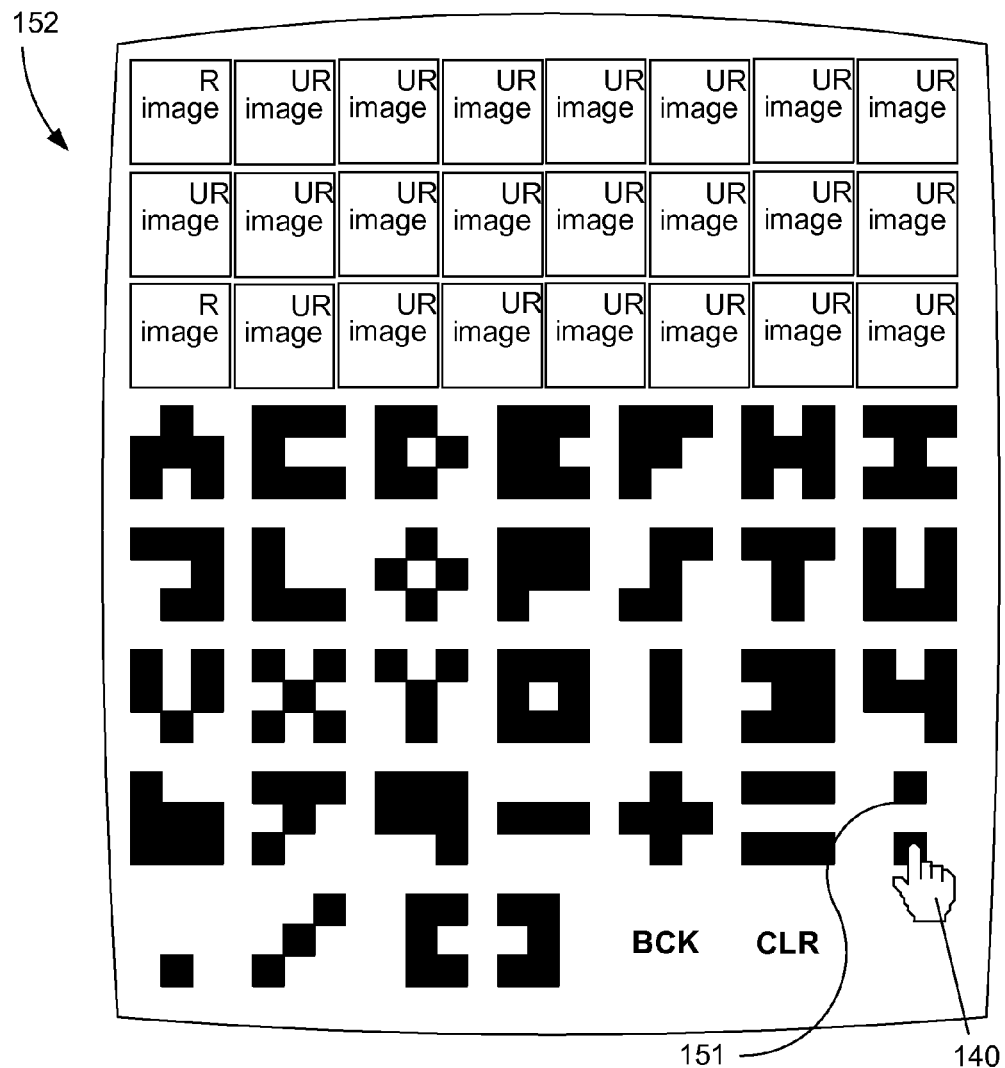

After clicking on pattern 144, screen 100 presents the screen view shown in FIG. 13. In FIG. 13, pattern 151 matches pattern 152 formed by the recognizable items. Therefore the user moves pointer 140 so that it is positioned above pattern 151. The user then clicks on pattern 151.

After clicking on pattern 151 the user is granted access. Hence, as described above, the solution for allowing access to the computer system is: ▪▪▪▪
(or, using the indices of the patterns, 4-9-17-28.)

Fourth Preferred Embodiment

The fourth preferred embodiment shown in FIGS. 14-17 is very similar to the first preferred embodiment. In the fourth preferred embodiment recognized faces are displayed next to unrecognized faces. The user indicates the number of faces that he recognizes to gain access.

Figure 14:
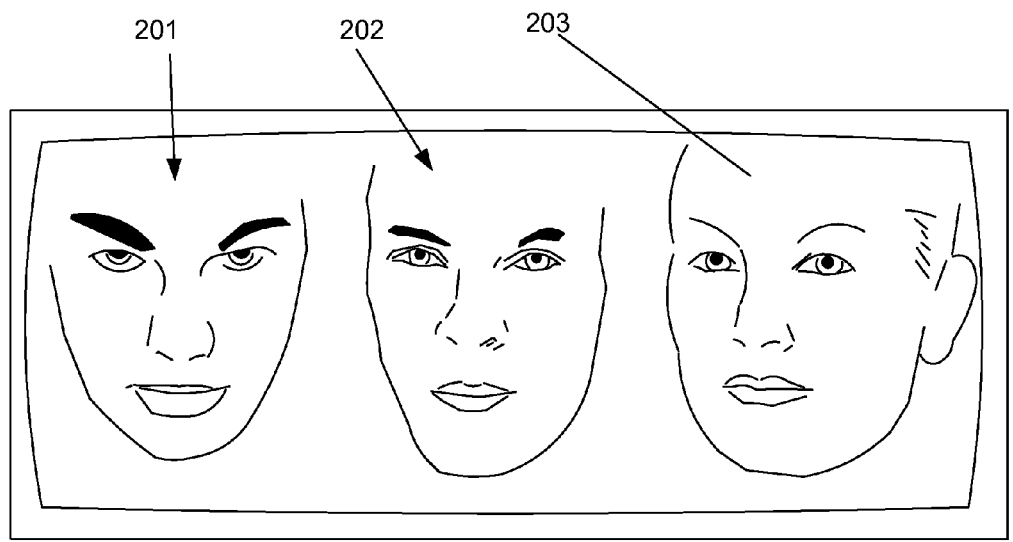

FIG. 14 shows monitor screen 200 and keypad 210. Monitor screen 200 displays unique face photographs 201-203. Photograph 201 is unrecognized by the user. Photographs 202 and 203 are both recognized by the user. Because the user recognizes two of the three photographs he presses button 204 on keypad 210 to indicate "2".

Figure 15:
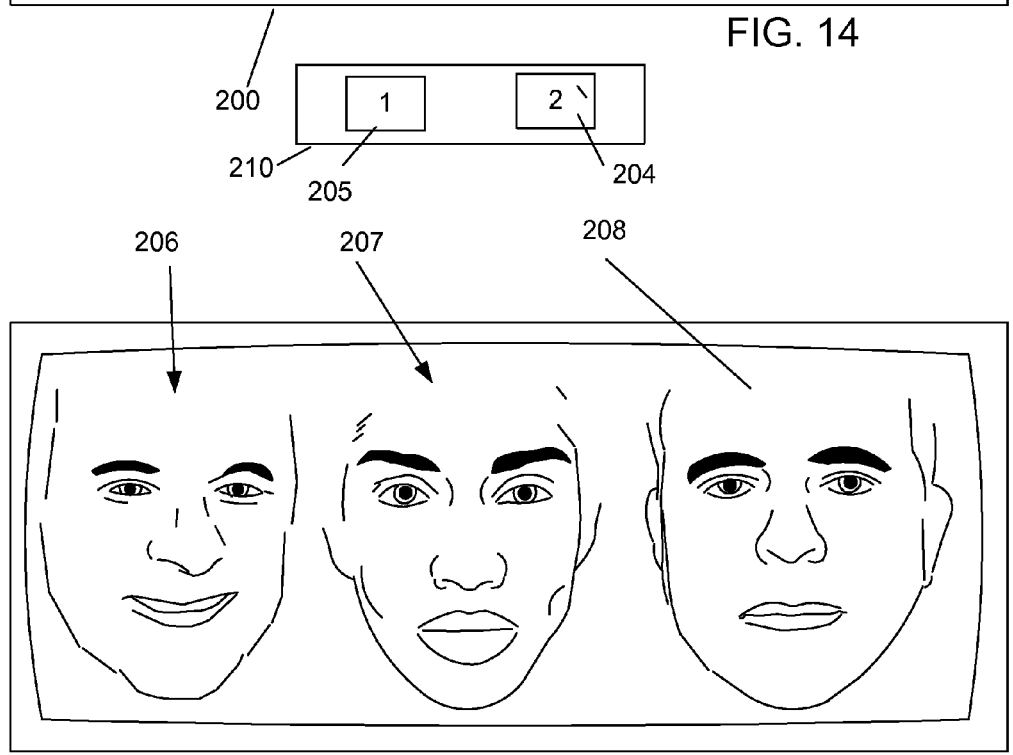

In FIG. 15 monitor screen 200 displays unique face photographs 206-208. Photographs 206 and 207 are unrecognized by the user. Photograph 208 is recognized by the user. Because the user only recognizes one of the three photographs he presses button 205 on keypad 210 to indicate "1".

In FIG. 16 monitor screen 200 displays unique face photographs 211-213. Photograph 212 is unrecognized by the user. Photographs 211 and 213 are both recognized by the user. Because the user recognizes two of the three photographs he presses button 204 on keypad 110 to indicate "2".

In FIG. 17 monitor screen 200 displays unique face photographs 214-216. Photographs 214 and 215 are unrecognized by the user. Photograph 216 is recognized by the user. Because the user only recognizes one of the three photographs he presses button 205 on keypad 210 to indicate "1".

Hence, as described above, the solution for allowing access to the computer system is 2-1-2-1.

Level of Security

The harder it is to guess a password, the higher the level of security. For example, by increasing the number of items displayed on an individual displayed entry screen, the level of security is increased. The level of security can also be increased by raising the number of entry screens. For example, in the first preferred embodiment shown in FIGS. 1-4, the level of security can be increased by increasing the total number of items displayed on screen 100 at any given time. FIGS. 1-4 show three items on screen 100. The more items shown (for example, six items or seven items), the harder it is for an attacker to guess the number of recognized items, and the higher the level of security. The level of security can also be increased by having a longer password. For example, in FIGS. 1-4 there are four entry screens for a four digit password. Eight entry screens, for example, would increase the level of security (significantly, the security would not simply be double, rather, it would go from a 1 in 81 chance of guessing correctly, to a 1 in 6561 chance—an increase by a factor of 81.)

As described above, the user input is ultimately reduced to a passcode consisting of a certain number of digits, each in a certain range. The length of the passcode directly corresponds to the number of entry screens. The range of the digits is from 1 to the maximum number of known items (count variant,) or from 1 to the number of subgroups (compare variant), or from 1 to the number of comparison patterns (match variant.)

The range of digits is the base or radix R of the number that is the passcode. The number of possible combinations (passcodes) C for any given access procedure with N entry screens is $C=R^N$. The more items on an entry screen and the more entry screens, the higher the level of security since with increasing C it becomes increasingly unlikely that a random guess will match the required passcode.

Connectivity

Figure 18:
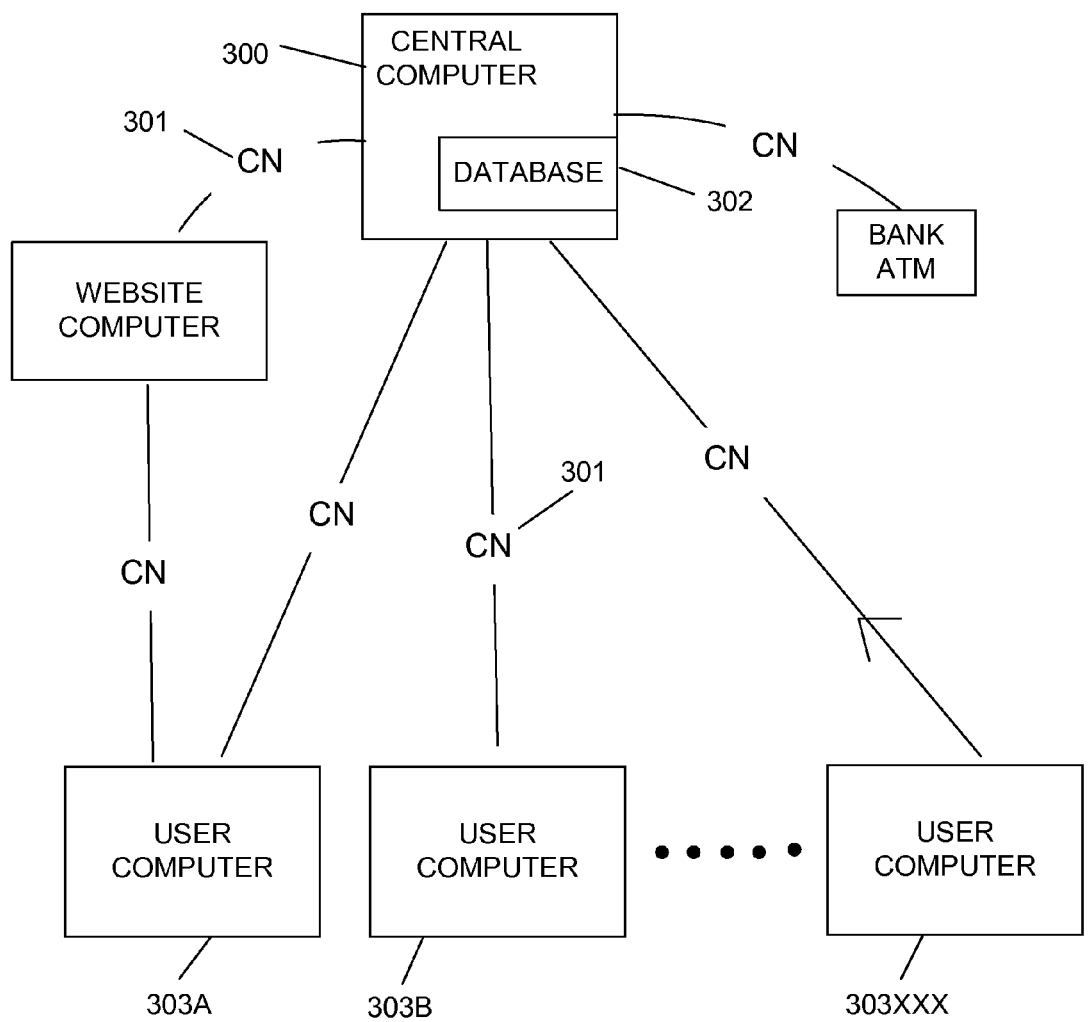
FIG. 18 shows the connectivity of a preferred embodiment of the present invention.

FIG. 18 shows a connectivity block diagram of a preferred embodiment of the present invention. Multiple users are connected through their computers 303 to central computer 300 via computer network 301. In a preferred embodiment, computer network 301 is the Internet. Users upload items to central computer 300 via computer network 301. Items are stored in database 302.

Uploaded Recognizable/Known Items

Uploaded items are recognizable and known by the user so that he can identify them when seen again. The set of known items can be made up of any item that has special meaning to the user. In the case of faces, these could be photographs of the user's grandparents, parents, siblings or childhood friends. The items could also be photographs of the user's childhood home, high school, favorite teacher, favorite actor, first car, artwork or any 'special' picture that the user took. Items may also be word items. For example, the user can upload words that have special meaning to him. The words can be names of people, places or things. Security comes from the inability of anyone but the user recognizing the item as 'special'.

Categorization

In a preferred embodiment, the user categorizes his items prior to upload. For example, the user may categorize his items as "Faces of People I Know". Or he may categorize his items as "Photographs of Automobiles I Know". Or he may categorize his items as "Photographs of Houses Known to Me". His items are then stored in database 302 in accordance with the category assigned by the user.

Unrecognizable/Unknown Items

In a preferred embodiment unknown items are chosen to look as similar in kind and be similar in number to known items as possible while still clearly falling into the 'unknown' category. For example for a specific user, if the known recognizable items are faces, then the same number of unknown faces should be compiled. Or if the known recognizable items for a specific user are brown cars, then the same number of unknown unrecognizable items of brown cars should be used.

The User Uploads Both Known And Unknown Items

In a preferred embodiment, the user uploads the known items and the unknown items. The user, therefore, is the only person in the world who knows which items are known and which items are unknown. The user preferably will upload an approximately equal number of known and unknown items. For example, if the user is uploading photographs of faces of people he knows, the user will also preferably upload an approximately equal number of pictures of faces of people he does not know. The user should take care to make sure that the pictures or otherwise indistinguishable from each other so that an unauthorized observer could not use reasoning or logic to make a good guess at the distinction of known or unknown. For example, it would be undesirable for the user to upload pictures of his family members for people he knows and then pictures of well known celebrities for people he does not know. An observer could make a well educated guess as to the categorization. Instead it would be preferable for the user to obtain random pictures of non-celebrities for his unknown category. However, some celebrities may have 'special' meaning to the user and so could well be categorized as 'known'—only the user knows the category.

Entry Screen Characteristics For Increased Security

To make it harder for potential attacker to determine if the item is known or unknown, in a preferred embodiment it is required that at least one item of each category be present on an entry screen. This ensures that no entry screen can be readily put into a single category based on the solution. (If the solution were 0, for example, an observer could categorize all items as unknown.)

Flexibility

In a preferred embodiment the number of unknown and known items on an entry screen is flexible and can be modified depending on security requirements. For example the ease of use is increased by decreasing the number of items on an entry screen and decreasing the total number of entry screens. Conversely, the level of security is increased by increasing the number of items on an entry screen and increasing the total number of entry screens. This can be adjusted dynamically; should an 'easy' access procedure fail, the next access procedure can be made harder—an authorized user will incur only a slight inconvenience, but an attacker will face a much more difficult problem.

Additional Features

Figure 19:
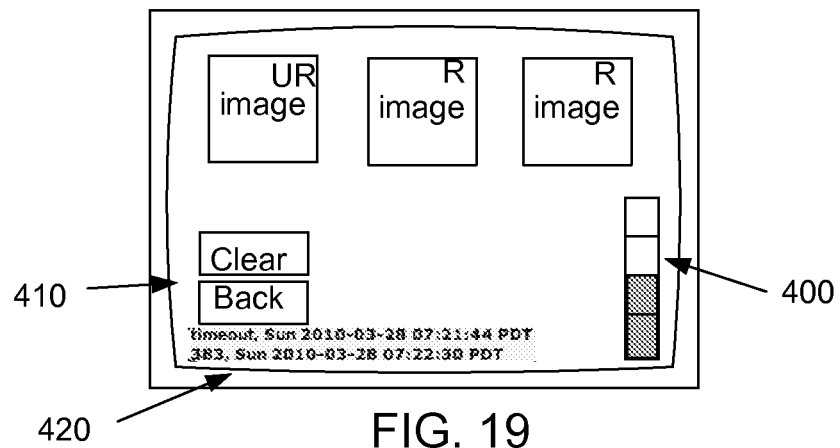
FIG. 19 shows another preferred embodiment of the present invention.

Entry screens can have additional features enhancing ease-of-use and security. For example, as shown in FIG. 19, progress display 400 indicates the remaining number of entry screens left in the sequence. This can be a number or a percentage or any other appropriate kind of indicator.

Clear and Back buttons 410 allow the user to abort the entry process at any time or go back to redo an entry screen. In a preferred embodiment the Back button works only once per entry screen and goes back only a single step. This limitation guards against an attacker making numerous attempts to go back and try again.

Information field 420 displays the date, time and result of the most recent access attempt. Results can be one of 'pass', 'duress', 'fail', 'timeout', 'canceled', or 'error'. The second line displays the sequence number of the current screen and the date and time the screen was created. The information field can be used to more easily detect whether an entry screen has been tampered with.

An entry screen could also display/incorporate any or all of
a watermark
a checksum
the geographic location of the last access
a user picture.

Word Items For Entry Screens

Figure 20:
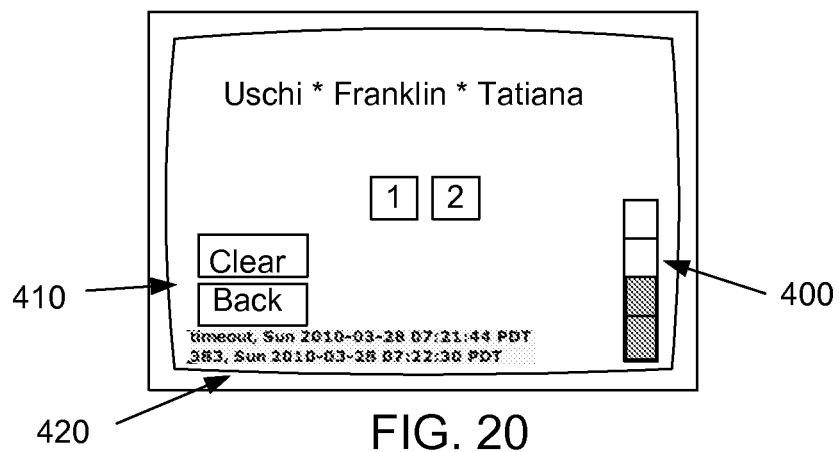
FIG. 20 shows another preferred embodiment of the present invention.

FIG. 20 shows a preferred embodiment of the present invention similar to the first preferred embodiment. However, in FIG. 20 word items are either known or unknown. For example if the user recognizes two of the names in FIG. 20, he will tap the number 2 button.

Figure 21:
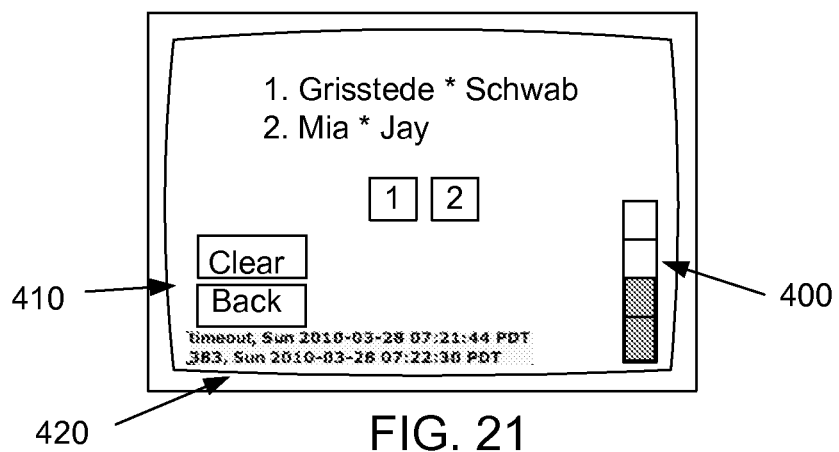
FIG. 21 shows another preferred embodiment of the present invention.

FIG. 21 shows a preferred embodiment of the present invention similar to the second preferred embodiment. For example if the user recognizes one of the names in the second row but none of the names in the first row, he will tap the number 2 button.

Entry Screen Customization And Branding

Figure 22:
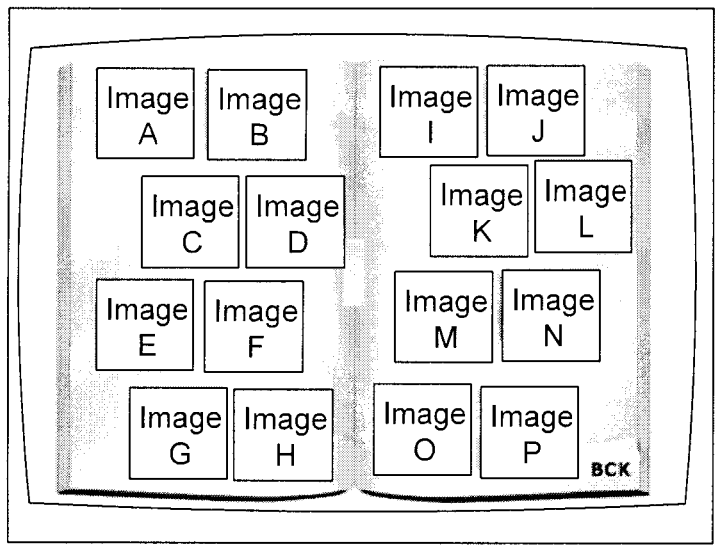
FIGS. 22-26 show preferred entry screen styles.
Figure 23:
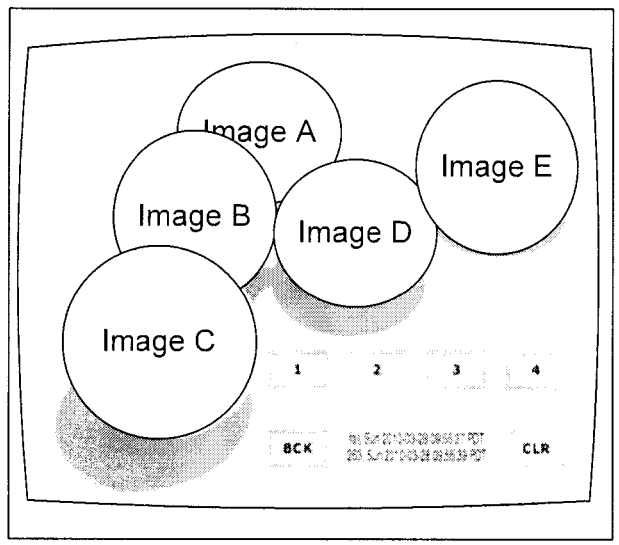
Figure 24:
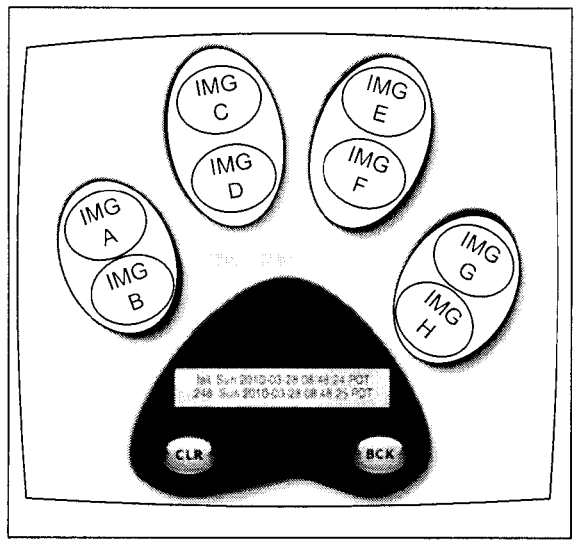
Figure 25:
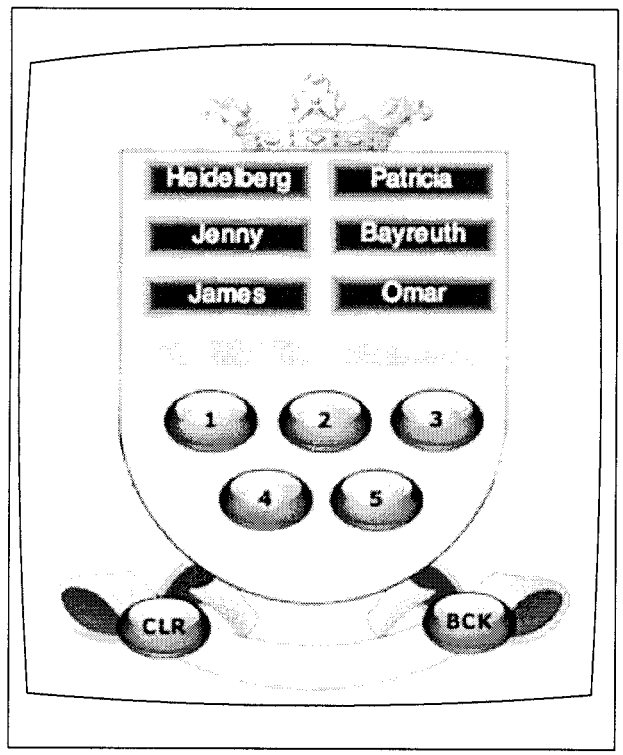
Figure 26:
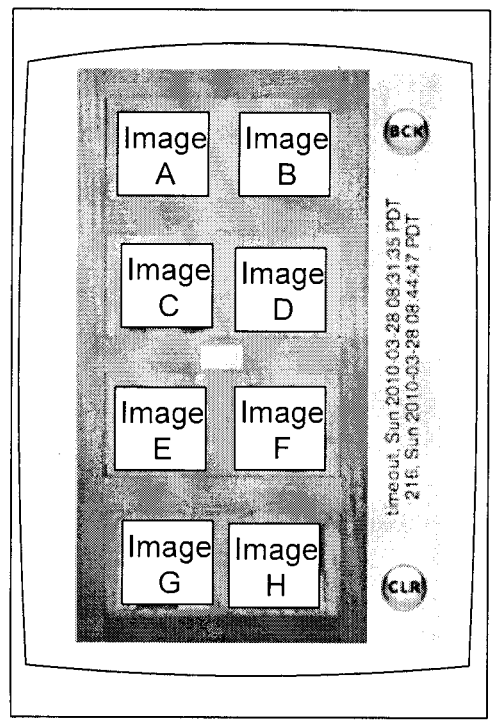

Entry screens can be modified to display company logos and advertising. Items can be masked or have overlays (such as frames.) Input controls can have a variety of appearances. For example, FIG. 22 shows a entry screen that similar to an open book. FIG. 23 showing items framed by floating pearls. FIG. 24 shows an entry screen that appears similar to an animal's paw. FIG. 25 shows an entry screen that appears to be similar to a crest. FIG. 26 shows an entry screen that appears similar to a bookshelf.

Verifier

A verifier is the entity that presents the entry screens and checks (verifies) the user's input and then grants or denies access to the resource in question. In a preferred embodiment central computer 300 (FIG. 18) is programmed to operate as the verifier. The verifier can be: 1) a central server functioning analogously to a certificate authority, 2) an off-site web server associated with an institution, company, web site or online store, 3) an on-site server associated with an institution or building, 4) a stand-alone computer—a desktop computer, laptop or smart phone, or 5) a device such as a safe, a door lock or padlock.

In cases 1) and 2) the verifier communicates with distinct, remote entry terminal(s)—most likely through the Internet. In case 3) the verifier communicates with distinct, remote entry terminal(s). Communication may be wireless or wired through a Local Area Network (LAN.) In cases 4) and 5) the entry terminal and verifier are combined in a single device.

Some Additional Security Features

The following features and characteristics of the method contribute to its security:

As explained above access is granted based upon the known/unknown distinction between items.

The known/recognizable and unknown/unrecognizable items stored in database 302 (the 'ID file') are unique for each user (FIG. 18).

The complexity and size of the ID file is an advantage in that it makes it harder to retrieve large files. Even if successful in downloading the large ID files, they are practically useless to an attacker because he does not know which items are known and which are unknown for each specific user and would require a prohibitively large effort to analyze.

Even if the items are words, the words themselves are not the secret. As with photographs, only some of the words are "known" by the user.

Entry screens are transmitted from central computer 300 to an entry terminal (for example, an ATM machine) as single images composed of the item data. It is impossible for an attacker to automatically analyze the entry screen items in any useful way.

Entry screens are presented randomly to the user. For example, entry screens are created at central computer 300 with different items in random order upon each log in attempt. Hence re-use of intercepted entry screens (replay attack) are pointless. It also acts as two-way authentication: a user will not be able to gain access unless presented with his own entry screens using his own submitted items. Therefore, the verifier can be sure it is dealing with a legitimate user; conversely, the user will know that something is wrong when presented with unsolvable entry screens.

Even though entry screens come from a large pool, their number is fixed. However, they can be modified by the verifier for each access procedure to make the correspondence between database and displayed entry screen more obscure: the order of the presented items on an entry screen can be switched at random, since it does not affect the solution. Image items can be mirrored at random, since they will still be just as recognizable to a human brain, but will be an entirely different item to a computer.

The result of the access procedure is transmitted to the verifier at the end of the entry screen sequence. No feedback is given as to the validity of input for each entry screen.

In a preferred embodiment a time limit can be set for the overall procedure, as well as for each individual entry screen, to avoid 'lookup' which will be much more time consuming than straight forward (and legitimate) access. Also, to avoid trial and error, a limited number of failed access attempts can be enforced, after which some defensive action can be taken. This defensive action does not necessarily have to be a lock-out—it can be a switch to another entry screen format or a lengthening of the entry screen sequence.

Because items are only known or unknown to a specific user, passwords cannot be shared, communicated, written down, easily guessed, observed or stolen.

In a preferred embodiment the first entry screen can be designated as the coercion screen. A deliberately false solution can be considered a signal to the verifier that the access is performed under duress. Incorrect entry cannot be detected by an observer and access will be allowed if the remaining screens are solved correctly. A verifier can then take a predetermined action: alert authorities, deny access in a non-suspicious way ("Sorry, the service is temporarily unavailable. Please try again later.") or direct the access to a restricted or dummy set of resources.

In another preferred embodiment a second or third coercion screen is utilized. This is to allow for honest user mistakes if only a single coercion screen is used. Alternatively a predetermined number of successive false entries can likewise be utilized to signal coercion.

Sound As An "Item"

As stated above, items can be virtually any type of visual item. A visual item can be a drawing of a person or animal, a photograph of a car, a photograph of a person's face, a drawing of a palm tree, or a drawing of the moon. Also as described above, items also include words. It does not matter if an attacker observes a user's entry screen with seven words displayed. If the user taps "2" the hacker only knows that 2 of the words have been categorized as "known" by the user. This information is useless to the hacker. He does not know which two words are important.

A sound bite can also be used as an item. Instead of displaying items or words, an entry screen will emit sounds. The user can then indicate the number of sounds that are known and recognizable using procedures similar to that described above.

One Preferred Procedure For Creating An ID file

There are a variety of ways by which a database is created at control computer 300 and a variety of ways by which entry screens may be displayed.

In one preferred embodiment, the user specifies which sets of known/unknown items to use. Items, sound or text can be used singularly or together. The user also specifies how many items of each set to use and which formats of pools to produce (e.g. 5<6 or 4×2) and the desired number of entry screens (size) for each pool. A pool of a specified format is created for each item kind resulting in, continuing the example, pools for 5<6 IMG, 5<6 TXT, 4x2 IMG, 4x2 TXT.

Creating the Item Sets

Each user must create two sets of items: known and unknown. Preferably, the items are of one or more of these formats: images, text, and sound. The "best" format from a usability point of view is images. The "easiest" is text.

Visual Images

Any kind of visual image can be used. Dimensions in the range of 64×64 to 128×128 seem most reasonable. With the help of software a user collects visual images. Known images should come from the user's personal photo library of 'special' items. Family members, friends, pets, cars are some of the candidates. Users can also pick famous art, movie posters or movie stars.

Sound

Selecting sound requires similar considerations to selecting image items. Sound clips can be recorded by the user or taken from existing material.

Text

Text items are the easiest to collect. They have the drawback of not being as user friendly for the access procedure, since text requires reading rather than simple recognition. This makes text harder to use and entry screens not as visually appealing. However, text has the advantage that it requires at minimum a very simple LCD display and also, that it can be read out loud by a computer, making the method available over the telephone or to the visually impaired. Known items should be first names of family and friends, favorite band names, places, movie titles and so on. Preferably they should be single, short words. Unknown items should be random names, bands and places and be generally similar.

ID File

Figure 27:
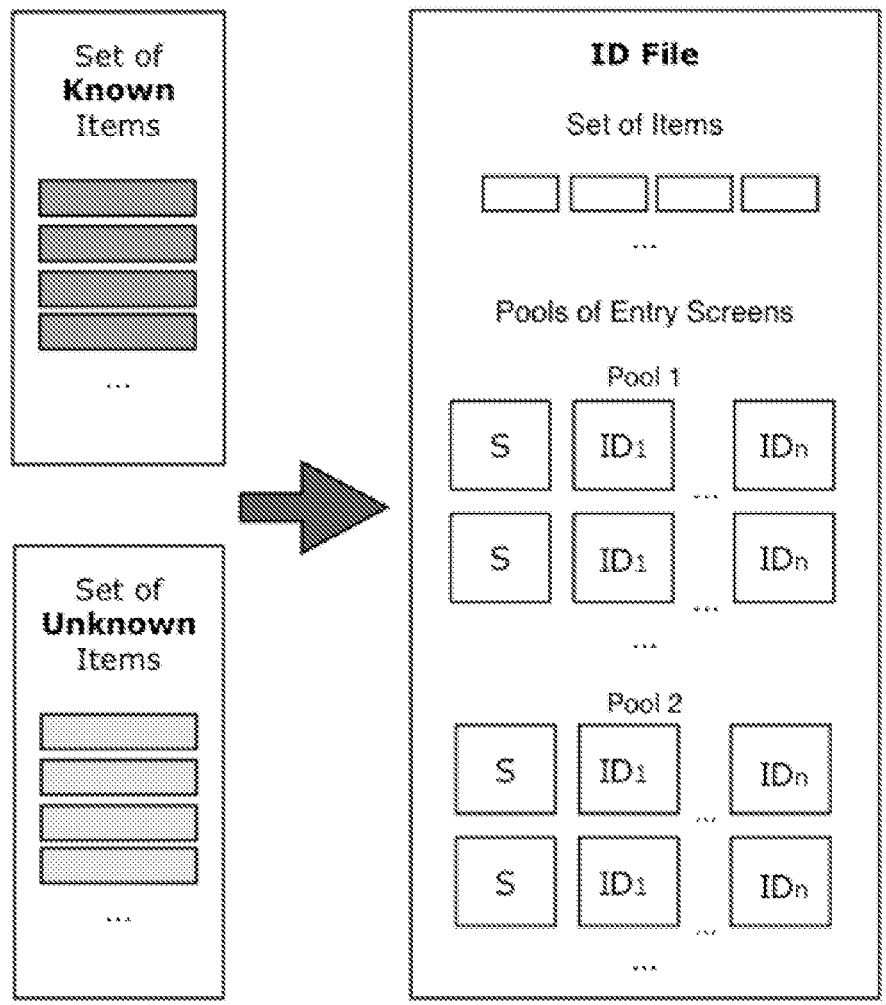
FIG. 27 shows a preferred ID file.

An ID file is shown in FIG. 27. The ID file is a file containing all information needed to provide user specific entry screens for access. It is (for a single user) or is part of (for multiple users) the database 302 from which entry screens are created.

The ID file stores the list of item data used for entry. As shown in FIG. 27, the ID file is created from a set of user supplied known items and a set of unknown items. In a preferred embodiment, the items in the ID file are in random order and give no indication as to which category (known or unknown) they belong to. This is an important security feature and central to the present method: the knowledge needed to successfully gain access is stored indirectly and ideally, cannot be recovered from the ID file without the cooperation of the person that provided the items.

Each pool of entry screens corresponds to one of the entry screens formats described earlier. A variable number of entry screens is generated and stored as a group of n+1 values in the ID file. The first value is the solution (S) to the screen, the following values are item IDs indicating which item data to use to build the entry screen.

Creating the ID File

The ID file is the 'fingerprint' of the user. It is uploaded to a verifier during enrollment and used to prepare entry screens for the access procedure.

In a preferred embodiment the user specifies which sets of known/unknown items to use. Items, sound or text can be used singly or together. In a preferred embodiment the user also specifies how many items of each set (known items and unknown items) to use, which formats of pools to produce and the number of desired entry screens for each pool. A pool of a specified format is created for each item kind. For example, a user may specify that he wants pools of 15 known items and 15 unknown items. He may state that he wants 4 entry screens from the two pools and that on each entry screen he wants three items shown.

Preferably, items are shared by all pools. The ID file contains the item data in random order—item categories are not part of the ID file. An ID table is used to associate an item with a pool. It is a table of ids: one row per item. Each column specifies the item's id in the pool corresponding to the column index. For example, column three corresponds to the third pool in the ID file and contains the item id used to retrieve the item data when creating entry screens for this particular pool. If an item is not used by a pool, then its item id is 0.

User's Computer Creates ID File

In a preferred embodiment, the user creates the ID file at his computer prior to uploading the ID file to control computer 300. For example, in FIG. 18 User Computer 303A is programmed to generate a table of item ids for each pool: one row per entry screen. A row is a list of item ids which will be used to identify the item data with the help of the ID table. The first value in the row is the solution of the entry screen. It is encoded in a simple manner to not be 'human-readable' for a bit of additional security. The following values are the item ids making up an entry screen. Each variant interprets these values slightly differently:

For the count variant (discussed in the First Preferred Embodiment), it is simply a list of item ids. This list can be shuffled at random by the verifier to further hide the association between the row and the entry screen being displayed.

For the compare variant (discussed in the Second Preferred Embodiment), item ids are grouped together. The verifier can shuffle the item ids in each group, but not simply all item ids. The order of the groups can be shuffled as well, but the solution is the group's index and must 'stick' to the group.

For the match variant (discussed in the Third Preferred Embodiment), item ids must remain in the given order, since the order represents the solution symbol as known items in a grid of unknown items.

In a preferred embodiment a pseudo-random number generator (PRNG) is used to make the order of item data, entry screens and item ids as unpredictable as possible.

Entry screens for the count variant embodiment discussed in the first preferred embodiment are generated preferably as follows: Number of items on the entry screen=I. First solution S is picked randomly from the range 1-R (where R=I-1). Then S items are picked randomly from the list of known items. Then I-S items are picked randomly from the unknown list. To avoid duplication on an entry screen each picked item is marked so it does not get picked again. Once there is a list of items quality assurance is performed: the item ids are sorted and three strings are produced: 1) a concatenation of all item ids A, a concatenation of the item ids for the known items K, and a concatenation of the item ids of the unknown items U. If string A is found in the list of already prepared entry screens, then the screen is a duplicate it is discarded. If there is only one known item on the screen (solution=1) then the screen is discarded if string U is found in the list of entry screens, because the only difference between screens would be the single known item. Similarly we discard the screen, if there is only one known item (solution=I-1) and the string K is a duplicate. Additional criteria may be determined and applied. If the screen passes QA, then we add it to the list of prepared entry screens along with the three strings and continue.

Screens are generated until the desired number is reached or until a certain number (e.g. 100) of successive screen candidates fail QA. Lastly item ids are shuffled on each entry screen. Also the entry screens are shuffled. Then the entry screen pool is added to the ID file.

The compare variant (discussed in the second preferred embodiment) is slightly more complicated. A solution S is picked. The first group of items generated is the solution group—it will later be put into its proper place (since the solution is the *index* of the solution group.) A number of known items for the solution group is picked. The range is from 1-G. G is the group size. The solution group must have at least one known item; it can also be made up of only known items or any number in between—let SK be the actual number. Now the remaining R-1 item groups are generated (R is the radix, the number of groups.) Each of these must be 'less familiar' than the solution group, so they can contain 0 . . . SK−1 known items. The items are picked randomly from the two item sets.

QA for this variant is trickier as well. As above, duplicate screens are discarded if it has a duplicate solution group. Finally, the solution group is swapped into its proper place.

Screens are generated until the desired number is reached or until a certain number (e.g. 100) of successive screen candidates fail QA. Lastly the item ids are shuffled within each group, the non-solution groups, as well as the entry screens. Then the entry screen pool is added to the ID file.

Figure 28:
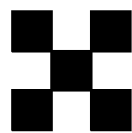
FIG. 28 shows a preferred comparison pattern.
Figure 29:
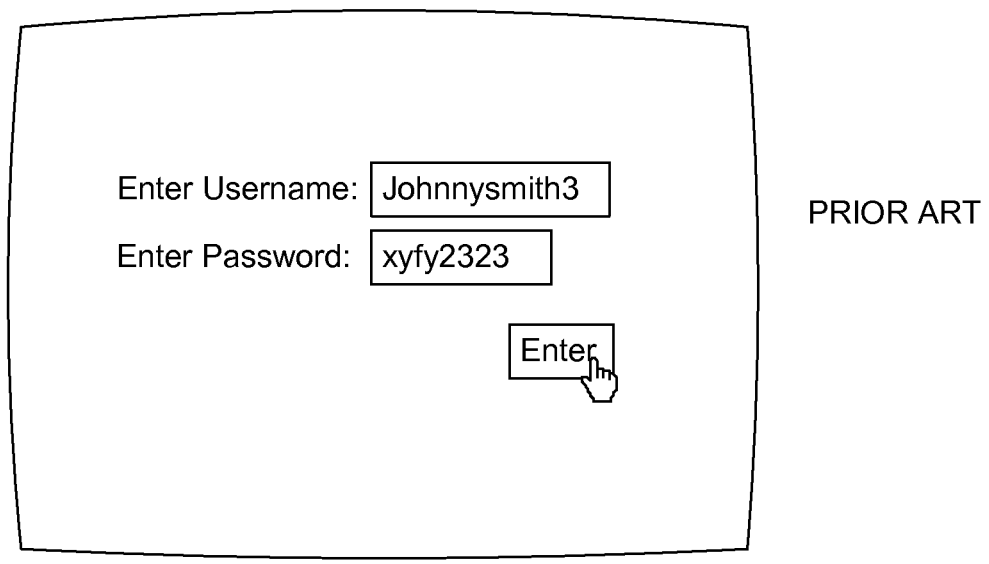
FIG. 29 shows a prior art user authentication entry screen.

For the match variant (third preferred embodiment) a grid is filled with unknown items. The solution is picked randomly from the range 1 . . . R. Then a top/left starting point is picked for the solution symbol in the grid known items are put into the grid according to the definition of the symbol. For example, the symbol X, using a 3×3 table, can be defined as shown in FIG. 28. Each black box will be one of the known items. Proper QA will have to be determined. At the very least it is preferable to avoid duplicate screens. Screens are generated until the desired number is reached. Lastly, the items on each screen are mixed. For example, items are exchanged randomly and pair-wise with the condition that the items have the same category. Then the entry screens are shuffled. Then the entry screen pool is added to the ID file.

The last step is to collect the item ids for each screen in each pool into the ID table.

The ID file will then be a text file containing:
Item data (in ASCII Hex format)
ID table
entry screens for each pool For easier parsing, the text file is organized in lines, each line preceded by a tag identifying its kind.

The ID file is now ready for enrollment with a verifier.
Sample ID File (Extract)
DF;1;21; data file header
POOL;2<3 IMG;1000;1;2;3;0;0;0;;; pool header
S;00403109810900105919316900101117819900109011-11910041970060510010220231 53 . . . ; all screens for this pool
POOL;3<4 IMG;1000;1;3;4;0;0;0;;;
S;00409803612407400112116806309100312009315816700114315910605500803302415 9 . . . ; all screens for this pool
. . . additional pools
IF;1;21;200;PNG; items header
IDS;0790390800700800110220780990670830830410820970370710480680741000 . . . ; item ids of an item in each pool
IDS;0240140620230490020140790850120050090047027018052052063059077094002 0 . . . ; item ids of an item in each pool
. . . additional ids, one ID table entry for each item
IMG;
89504E470D0A1A0A0000000D494844520000004000-0000400802000000250BE6 8 . . . item data in ASCII Hex format
. . . additional item data
TXT;596573 item data in ASCII Hex format
. . . additional text data
SND; . . . item data in ASCII Hex format
. . . additional sound data
plus any extra data, for example a user picture for visual identification of an ID file.

Enrollment

Enrollment is the process of establishing a connection between a user and a verifier. A verifier can be a company or a device. The user gives his identifying and/or financial information to establish an account with the verifier. Then he uploads his ID file which will be used for authentication.

The verifier accepts the ID file and splits it into individual files (or database records.) The individual files are encrypted by the verifier with a key generated from (among other things) the verifier's ID, user's name and account name.

The files (or records) are:
one for each item's data, identified by item id (e.g. Chris K-bitSplit-Enterprises-Generic-12696102412010102993-IMG_000.txt):
the ID table (e.g. Chris K-bitSplit-Enterprises-Generic-12696102412010102993-ID_TABLE.txt)
the pool table (e.g. Chris K-bitSplit-Enterprises-Generic-12696102412010102993-POOL_TABLE.txt)
one for each pool (entry format,) identified by index (e.g. Chris K-bitSplit-Enterprises-Generic-12696102412010102993-POOL_000 .txt)

Access Procedure

The access procedure begins with the user contacting the verifier and telling the verifier the account—this can be the user's name or any other unique string. This string need not be kept secret (although it's probably not a bad idea.) The account selection may also be accomplished by the swipe of a 'credit' card. This applies to remote transactions—when the verifier is a door lock, the user can cycle through 'accounts' with simple button presses or select from a menu. In the case of a padlock there would only be one 'account' and this step would be unnecessary.

Once the verifier has been told which account to use, it assembles a set of entry screens and serves them to the user. The set of entry screens is a list of image files or any other presentation suitable for the present pool format or terminal used. The user goes through the entry screens without further interaction with the verifier following procedures outlined above. At the end of the access procedure, the solution for all screens is sent to the verifier for verification. Based on the result, the user is either granted or denied access.

Generation of Entry Screens

The verifier looks in the pool table for the appropriate pool definition to use for the current terminal. The pool can also be a verifier or user preference, but it must match the terminal's capabilities. Now the verifier selects the required number of entry screens at random from the pool definition. The number of screens is given by the desired security level. If errors are allowed, the number of error screens is added. If a coercion screen is allowed, one more screen is added. Each selected screen is compared to the previously selected screens for this access procedure. If the screens are too similar, then the screen is rejected and another one is chosen. 'Similar' means that too many items are common to the screens. Since the set of items is limited, some repetition is unavoidable, but entry screens used for one access procedure should be as different from each other as possible. Duplication of screens (picking the same screen twice) is avoided.

Once the entry screens are selected, their solutions are recorded and a unique set of strings is generated for this access procedure. These strings will represent the possible solutions (1 . . . R) and are used by the terminal to communicate the solutions to the verifier. Since they are unique to each access procedure, they are of no use for future access if intercepted.

Depending on the variant, the verifier can modify the arrangement of items on the entry screen randomly before building the entry screen items. This artificially increases the number of different entry screens that are displayed to a user (and which may be recorded by an observer.)

To build an entry screen item, the verifier looks at the terminal definition for background item, additional elements, masks, frames and button items. The terminal definition also specifies the location of each item. The verifier retrieves the item's data and places it on the item.

Finally, in case of access through a web browser, an HTML file is generated that contains the items, the strings used for input as well as Javascript code to show the items and move to the next screen after the user provided input. After solving the last screen, the collected solution strings are sent to the verifier for checking. A timeout is set so if the access procedure takes too long, it is aborted.

Session ID

Upon first contact, the verifier cancels any current session associated with the account. Only one session (access procedure) at a time is allowed, since the ID file is unique to a person. The start time is noted (to keep track of elapsed time) and a new session id is generated. From this point on, all interaction is keyed to this id.

Authentication

To check the submitted solution strings the verifier translates the solution string of each entry screen—which is unique to the present session—into the actual solution. Then it compares the user's solution to the expected solution in order. Each match and each miss is counted. If the number of misses is less than the set amount of error screens then access is granted, otherwise access is denied. The usual mode for operation will not allow for an error screen. In addition, if access is granted, and coercion screens are enabled and the first solution is wrong, then the 'pass under duress' action is performed.

Encryption Keys to Decrypt User Emails And Files

In another preferred embodiment the user gains access to his email or files. For example, encryption keys are generated from a user's ID file. Entry screens are presented to the user in a fashion similar to that as described above. If the user successfully enters the correct information into his computer after reviewing the entry screens, then the correct encryption key will be generated and his email and/or file will be decrypted.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A user authentication system for permitting user access to a computer controlled device through an access procedure, comprising:
   A) a display device for displaying a group of items to said user, said group of items comprising:
      1. user known items, and
      2. user unknown items,
   B) an input selection device for receiving input from the user, wherein said user input indicates the presence of or absence of known items within said group of items, wherein said user input is made without identifying which items within said group are known and which items within said group are unknown,
   C) a control computer programmed to automatically compare said user input to a predetermined answer that indicates the presence of and absence of known items within said group of items.
   D) an access device for allowing access when said user's input correctly indicates the presence of and absence of known items within said group of items,
   wherein said group of items includes a plurality of subgroups, wherein at least one of said plurality of subgroups includes at least one known item, wherein said user input comprises an identification of a subgroup within said plurality of subgroups with the largest number of known items.

2. The user authentication system as in claim 1, wherein the user uploads both of said known items and said unknown items to said computer.

3. The user authentication system as in claim 1, further comprising a user computer, wherein said user computer is programmed to generate an ID file comprising plurality of entry screens, each said entry screen comprising said known items and said unknown items, wherein said ID file is uploaded to said control computer from said user computer wherein said control computer utilizes said plurality of entry screens to display said known items and said unknown items to said user via said display device.

4. The user authentication system as in claim 3, wherein said display device displays said plurality of entry screens successively, wherein user input is submitted via said user input device successively after viewing each entry screen of said plurality of entry screens.

5. The user authentication system as in claim 1, wherein said user input comprises a count of the number of said known items within said group of items.

6. A user authentication system for permitting user access to a computer controlled device through an access procedure, comprising:
   A) a display device for displaying a group of items to said user, said group of items comprising:
      1. user known items, and
      2. user unknown items,
   B) an input selection device for receiving input from the user, wherein said user input indicates the presence of or absence of known items within said group of items, wherein said user input is made without identifying which items within said group are known and which items within said group are unknown,
   C) a control computer programmed to automatically compare said user input to a predetermined answer that indicates the presence of and absence of known items within said group of items.
   D) an access device for allowing access when said user's input correctly indicates the presence of and absence of known items within said group of items,
   wherein said group of items are displayed in a grid, wherein said known items are displayed in a pattern within said grid, wherein said display device further displays a plurality of comparison patterns, wherein said user input identifies which comparison pattern of said plurality of comparison patterns matches said pattern of known items within said grid.

7. The user authentication system as in claim 1, wherein said group of items comprises known and unknown photographs.

8. The user authentication system as in claim 6, where said known and unknown photographs comprise photographs of human faces.

9. The user authentication system as in claim 1, wherein said group of items comprise known and unknown sound items.

10. The user authentication systems as in claim 1, wherein said group of items comprise known and unknown word items.

11. The user authentication system as in claim 1, wherein said authentication system allows access to a personal computer.

12. The user authentication system as in claim 1, wherein said authentication system allows access to a website via a computer network.

13. The user authentication system as in claim 1, wherein said computer network is the Internet.

14. The user authentication system as in claim 1, further comprising a user computer, wherein said user computer is programmed to generate a user ID file wherein said user ID file comprises item categories comprised of said known items and unknown items, wherein said item categories are arranged into entry screen pools.

15. The user authentication system as in claim 1, further comprising a user computer, wherein said user computer is programmed to generate a user ID file wherein encryption keys are generated from said ID file for decrypting user emails or user files.

16. A method for authenticating a user and for permitting user access to a computer controlled device, said method comprising the steps of:
   A) utilizing a display device to display a group of items to said user, said group of items comprising:
      1. user known items, and
      2. user unknown items,
   B) receiving input from the user via an input selection device, wherein said user input indicates the presence of or absence of known items within said group of items, wherein said user input is made without identifying which items within said group are known and which items within said group are unknown,
   C) utilizing a control computer that is programmed to automatically compare said user input to a predetermined answer that indicates the presence of and absence of known items within said group of items, and
   D) allowing access via an access device when said user's input correctly indicates the presence of and absence of known items within said group of items,
   wherein said group of items includes a plurality of subgroups, wherein at least one of said plurality of subgroups includes at least one known item, wherein said user input comprises an identification of a subgroup within said plurality of subgroups with the largest number of known items.

17. The method as in claim 13, wherein said user input comprises a count of the number of said known items within said group of items.

18. A method for authenticating a user and for permitting user access to a computer controlled device, said method comprising the steps of:
   A) utilizing a display device to display a group of items to said user, said group of items comprising:
      1. user known items, and
      2. user unknown items,
   B) receiving input from the user via an input selection device, wherein said user input indicates the presence of or absence of known items within said group of items, wherein said user input is made without identifying which items within said group are known and which items within said group are unknown,
   C) utilizing a control computer that is programmed to automatically compare said user input to a predetermined answer that indicates the presence of and absence of known items within said group of items, and
   D) allowing access via an access device when said user's input correctly indicates the presence of and absence of known items within said group of items,
   wherein said group of items are displayed in a grid, wherein said known items are displayed in a pattern within said grid, wherein said display device further displays a plurality of comparison patterns, wherein said user input identifies which comparison pattern of said plurality of comparison patterns matches said pattern of known items within said grid.

* * * * *